United States Patent
An

(10) Patent No.: US 8,630,239 B2
(45) Date of Patent: Jan. 14, 2014

(54) STATION AND ACCESS POINT FOR EDCA COMMUNICATION, SYSTEM THEREOF AND COMMUNICATION METHOD THEREOF

(75) Inventor: Chang Hoon An, Suwon (KR)

(73) Assignee: LG Electronics Inc., Seoul (KR)

( * ) Notice: Subject to any disclaimer, the term of this patent is extended or adjusted under 35 U.S.C. 154(b) by 1058 days.

(21) Appl. No.: 11/829,738

(22) Filed: Jul. 27, 2007

(65) Prior Publication Data

US 2008/0069040 A1    Mar. 20, 2008

(30) Foreign Application Priority Data

Sep. 20, 2006  (KR) .................. 10-2006-0090982
Mar. 12, 2007  (KR) .................. 10-2007-0024111

(51) Int. Cl.
    *H04W 4/00*    (2009.01)
(52) U.S. Cl.
    USPC .................. 370/329; 455/422.1; 455/450
(58) Field of Classification Search
    USPC .................. 370/310, 329, 389, 448, 449; 455/422.1, 450, 436–442, 452.2, 453
    See application file for complete search history.

(56) References Cited

U.S. PATENT DOCUMENTS

| | | | | |
|---|---|---|---|---|
| 6,091,741 | A * | 7/2000 | Fujiwara et al. | 370/465 |
| 6,275,497 | B1 * | 8/2001 | Varma et al. | 370/431 |
| 7,203,463 | B2 * | 4/2007 | Bahl et al. | 455/68 |
| 7,224,704 | B2 * | 5/2007 | Lu et al. | 370/476 |
| 2001/0009544 | A1 * | 7/2001 | Vanttinen et al. | 370/338 |
| 2004/0087331 | A1 * | 5/2004 | Hwang et al. | 455/522 |
| 2004/0174833 | A1 * | 9/2004 | Raith | 370/311 |
| 2004/0267965 | A1 * | 12/2004 | Vasudevan et al. | 709/250 |
| 2005/0141548 | A1 * | 6/2005 | Koo et al. | 370/462 |
| 2006/0078001 | A1 * | 4/2006 | Chandra et al. | 370/473 |
| 2006/0215686 | A1 * | 9/2006 | Takeuchi | 370/445 |
| 2007/0036116 | A1 * | 2/2007 | Eiger et al. | 370/338 |
| 2007/0066273 | A1 * | 3/2007 | Laroia et al. | 455/343.2 |
| 2007/0110092 | A1 * | 5/2007 | Kangude et al. | 370/448 |
| 2007/0161364 | A1 * | 7/2007 | Surineni et al. | 455/343.4 |
| 2007/0263654 | A1 * | 11/2007 | Salokannel et al. | 370/448 |
| 2008/0112499 | A1 * | 5/2008 | Bennett | 375/267 |
| 2009/0067326 | A1 * | 3/2009 | Perrot et al. | 370/230 |
| 2009/0252124 | A1 * | 10/2009 | Yeo et al. | 370/336 |

* cited by examiner

*Primary Examiner* — Hassan Phillips
*Assistant Examiner* — Saba Tsegaye
(74) *Attorney, Agent, or Firm* — Birch, Stewart, Kolasch & Birch, LLP

(57) ABSTRACT

The present invention relates to a method of setting wireless communication channel contention mode considering terminal state information. According to an aspect of the present invention, there is provided a contention-based data communication system in a wireless communication where a plurality of terminals contend to obtain data transmission resources. The contention-based data communication system comprises a base station for controlling the communication, and a terminal device connected to the base station to transmit and receive data. In such a case, the terminal device transmits terminal state information representing a state of the terminal device to the base station and the base station sets channel contention mode using the received terminal state information. According to the present invention, since the channel contention mode considering a state of the terminal can be maintained, there is an advantage in that power consumption of the terminal can be minimized.

16 Claims, 5 Drawing Sheets

EDCA channel access method

EDCA channel access method

Contention between ACs in station

– EDCA TXOP bursting –

| Battery capacity | CPU load | temperature | reserve |
|---|---|---|---|
| 2 | 2 | 2 | 12 | bits

– State information of STA element –

Structure of HCF super frame containing contention free period and contention period – Data frame –

STATION AND ACCESS POINT FOR EDCA COMMUNICATION, SYSTEM THEREOF AND COMMUNICATION METHOD THEREOF

BACKGROUND OF THE INVENTION

1. Field of the Invention

The present invention relates to a method of setting wireless communication channel contention mode considering terminal state information.

2. Description of the Related Art

Wireless local area networks (LAN) are widely used in a variety of wireless user environments such as home networks, enterprise wireless networks and hot spots. A legacy commercial wireless LAN is an extension of the Ethernet, which provides only best effort services based on IEEE 802.11b standardized in 1999. However, wireless LAN users desire faultless transfer of multimedia streams without losing transmission data. Particularly, even in a wireless LAN environment, superior quality of service (QoS) is indispensable to new applications such as video or multimedia streaming.

Continuous desires of users for bandwidth expansion cause increased congestion and decreased relative transmission speed of the entire wireless network. Accordingly, a network manager comes to need a new mechanism to guarantee services of applications that require strict QoS even in a network with high congestion. Such requirements result in the development of a further enhanced media access control (MAC) protocol than in the conventional LAN.

802.11 MAC defines a mandatory function of distributed coordination function (DCF) and an optional function of point coordination function (PCF). That is, a transmission medium can operate both in contention mode of DCF and in contention free mode of PCF. DCF is an asynchronous transmission method, which provides a basic medium access method of 802.11 MAC and has been implemented in all kinds of commercial wireless LAN products. In terms of wireless medium access, DCF does not consider priorities between stations (terminals, hereinafter referred to as 'STA') at all. Such a characteristic of DCF does not reflect transmission of various types of data traffic, and thus cannot support QoS requested by users in the end.

A synchronous transmission method is a medium access method based on a polling mechanism, which is implemented through PCF. In PCF, a function of a point coordinator (PC) is placed at a central access point (hereinafter, referred to as 'AP'), and the AP directly controls all services provided to STAs in a centralized polling scheme. That is, the AP periodically polls connected STAs to give an opportunity to transmit frames to the STAs.

Legacy 802.11 MAC has many problems in supporting wireless LAN QoS. The DCF, i.e. a mandatory function of 802.11 MAC, does not provide any function of supporting QoS. Accordingly, when a DCF method is used, all data traffics are serviced in order of arriving at a transmission queue and processed in best effort mode.

Contrary to the DCF, PCF of 802.11 MAC has been developed to support real-time traffic services but currently supports QoS. However, the PCF has the following problems.

That is, in PCF, the PC placed at the AP defines a scheduling algorithm for the purpose of polling simply based on a round-robin method. However, there are practically various types of traffics that require differentiated QoS, and thus, the round-robin algorithm that cannot assign a priority to traffic is insufficient for supporting QoS.

Further, there is a problem in that if the size of a super frame is small, alternations between a contention period and a contention free period can lead to a considerable overhead.

Further, in legacy MAC, transmission of beacon frames or a starting point of a super frame can be changed. The PC prepares a beacon frame that should be transmitted after a target beacon transmission time (TBTT), and then transmits the beacon frame if the medium is idle as long as a point inter-frame space (PIFS). However, even though STAs cannot complete transmission of frames before a subsequent TBTT, they even can start to transmit frames. Therefore, there is another problem in that the transmission of beacon frame can be delayed.

The delay of beacon frame which should be transmitted immediately after the TBTT delays the transmission of time-constraint frames which should be transmitted within the contention free period. Such a problem causes time delay that is difficult to estimate in a contention free period and thus has a serious influence on QoS.

SUMMARY OF THE INVENTION

Therefore, the present invention is conceived to solve the aforementioned problems in the prior art. Accordingly, an object of the present invention is to provide a wireless communication system and method for setting channel contention mode considering terminal state information.

Another object of the present invention is to provide a wireless communication system and method for setting channel contention mode wherein varying terminal state information is continuously provided to a base station to allow optimal channel contention mode to be maintained.

A further object of the present invention is to provide a wireless communication system and method for setting channel contention mode wherein optimal channel contention mode is set according to a terminal state to allow power consumption of the terminal to be minimized.

According to an aspect of the present invention for achieving the objects, there is provided a contention-based data communication system in a wireless communication in which a plurality of terminals contend to obtain data transmission resources, comprising a base station for controlling the communication; and a terminal device connected to the base station to transmit and receive data, wherein the terminal device transmits terminal state information representing a state of the terminal device to the base station and the base station sets channel contention mode using the received terminal state information.

At this time, the terminal state information may include any one or more of remaining battery capacity information, CPU load information and temperature information of the terminal device.

Further, each of the remaining battery capacity information, the CPU load information and the temperature information may be divided into four groups each of which is expressed as 2-bit data.

In addition, the base station may set the channel contention mode according to the transmitted terminal state information in such a manner that transmission waiting time becomes shorter as the remaining battery capacity increases and the CPU load and temperature decreases.

Furthermore, the channel contention mode may be set in such a manner that values of channel contention parameters correspond to the terminal state information.

At this time, the channel contention parameters may include any one or more of AIFS, CWmin and CWmax which determine a backoff time.

Moreover, if it is determined from the received terminal state information that the channel contention mode needs to be re-set, the base station may re-set values of channel contention parameters and transmit data based on the received terminal state information.

In the meantime, the terminal state information may include a queue size of a serviced terminal.

Further, the base station may set the values of the channel contention parameters according to the transmitted terminal state information in such a manner that transmission waiting time becomes shorter as an amount of data stored in a queue decreases.

According to another aspect of the present invention, there is provided a contention-based data communication terminal device in a wireless communication in which a plurality of terminals contend to obtain data transmission resources. The terminal device is configured to transmit state information thereof to a base station and receive data transmitted in channel contention mode set by the base station.

According to a further aspect of the present invention, there is provided a contention-based data communication base station in a wireless communication in which a plurality of terminals contend to obtain data transmission resources. The base station is configured to receive terminal state information transmitted from a terminal device, set channel contention mode using the terminal state information, and transmit data in the set channel contention mode.

At this time, if it is determined from the received terminal state information that the channel contention mode needs to be re-set, the base station may re-set values of channel contention parameters and transmits data based on the received terminal state information.

According to a still further aspect of the present invention, there is provided a contention-based data communication method for use in a wireless communication in which a plurality of terminals contend to obtain data transmission resources, comprising the steps of (I) transmitting, by a terminal, terminal state information to a base station; (II) receiving, by the base station, the terminal state information from the terminal device; (III) setting, by the base station, channel contention mode using the received terminal state information; (IV) transmitting the set channel contention mode to the terminal; and (V) accessing, by the terminal, base station to obtain the data transmission resources in the set channel contention mode.

Further, steps (I) to (V) of the method may be repeatedly performed.

At this time, the terminal state information may include an amount of data stored in a buffer of the terminal.

Furthermore, the base station may set the channel contention mode according to the transmitted terminal state information in such a manner that transmission waiting time becomes shorter as the remaining battery capacity increases, the CPU load and temperature decreases and the amount of data stored in the terminal buffer decreases.

According to a still further aspect of the present invention, there is provided a contention-based data communication method for use in a wireless communication in which a plurality of terminals contend to obtain data transmission resources, comprising the steps of receiving channel contention information transmitted from a base station to the plurality of terminals; accessing base station to obtain the data transmission resources according to the received channel contention information; transmitting data containing terminal state information to the base station; receiving the channel contention information updated according to the terminal state information from the base station; and accessing base station to obtain the data transmission resources according to the updated channel contention information.

According to a still further aspect of the present invention, there is provided a contention-based data communication method for use in a wireless communication in which a plurality of terminals contend to obtain data transmission resources, comprising the steps of receiving terminal state information from a terminal device; setting channel contention mode using the received terminal state information; and transmitting the set channel contention mode to the terminal.

According to the present invention so configured, optimal channel contention mode can be maintained, and thus, power consumption of a terminal device can also be minimized.

DETAILED DESCRIPTION OF THE INVENTION

In the present invention, state information of a terminal device is included in a channel contention parameter that is used to guarantee QoS of a wireless communication. The present invention is not limited to the contents of the IEEE 802.11e standard. However, as a preferred embodiment of the present invention, an example that is applied in a wireless communication conforming to the IEEE 802.11e standard will be described for convenience of explanation.

Accordingly, in the present invention, an AP is an example of a base station and an EDCA parameter is an example of a channel contention parameter.

Further, to set channel contention mode is either to set a backoff time by setting the channel contention parameter or to adjust data transmission continuation time by setting a transmission opportunity (TXOP) limit.

Hereinafter, a preferred embodiment of the terminal device and access point, a wireless communication system comprising the same, and a method of setting channel contention mode according to the present invention will be described in detail with reference to the accompanying drawings.

Figure 1:
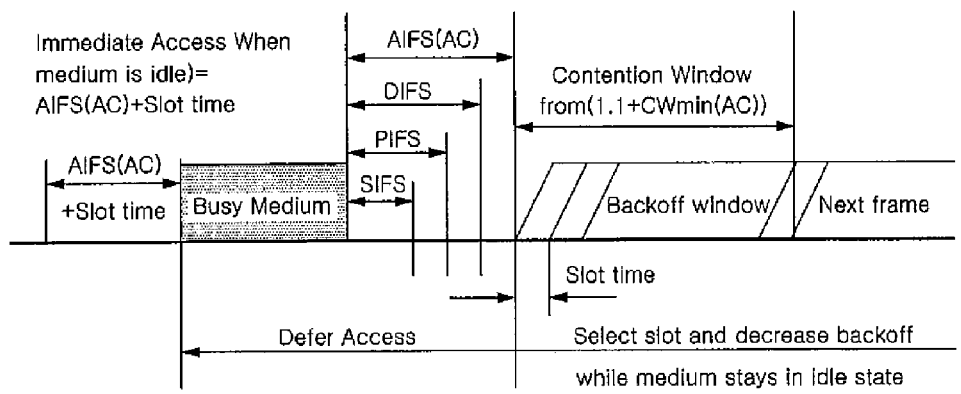
FIG. 1 is a schematic view illustrating an EDCA channel access method.
Figure 2:
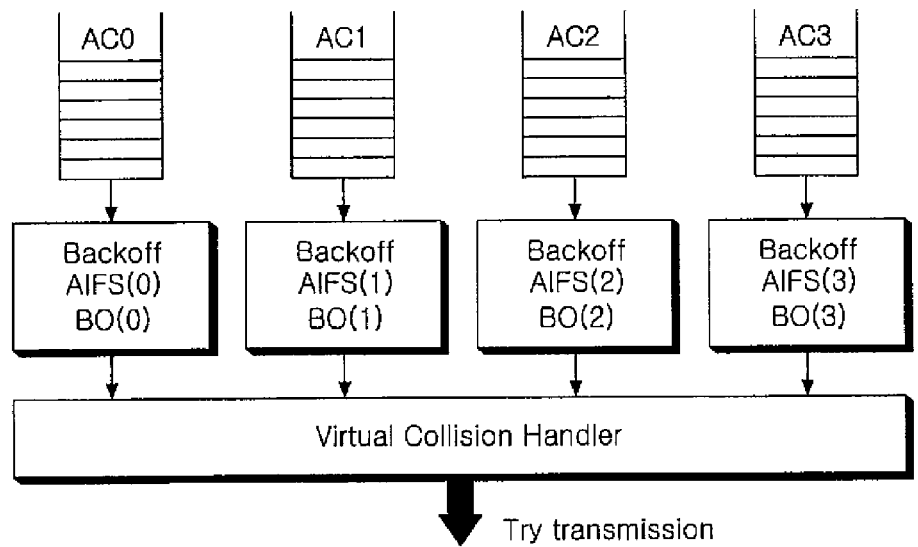
FIG. 2 is a schematic view illustrating a contention state between access categories (AC) within a station in the EDCA method.
Figures 3, 4:
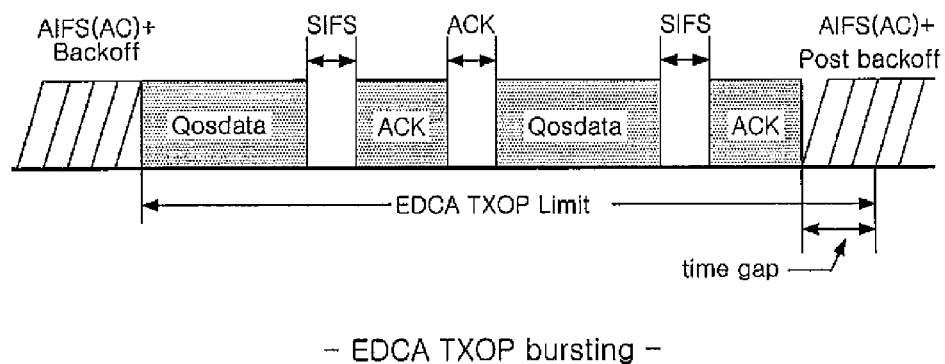
FIG. 3 is a schematic view illustrating EDCA TXOP bursting.
FIG. 4 is a view showing a data structure of terminal state information according to a preferred embodiment of the present invention.
Figure 5:
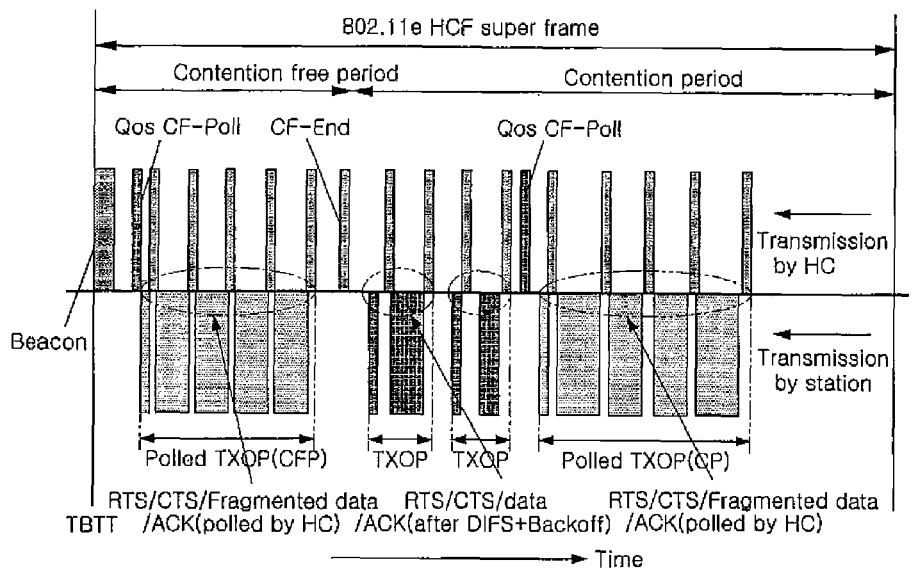
FIG. 5 is a schematic view illustrating a HCF super frame structure comprising a contention period and a contention free period.
Figure 6:
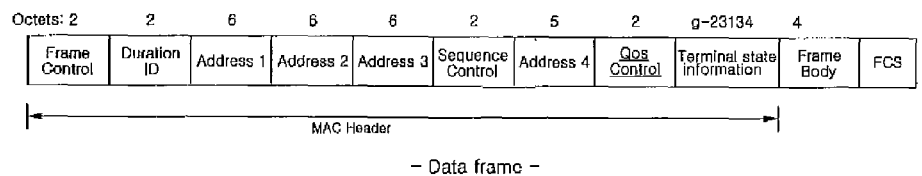
FIG. 6 is a view showing a DATA frame structure according to a preferred embodiment of the present invention.
Figure 7:
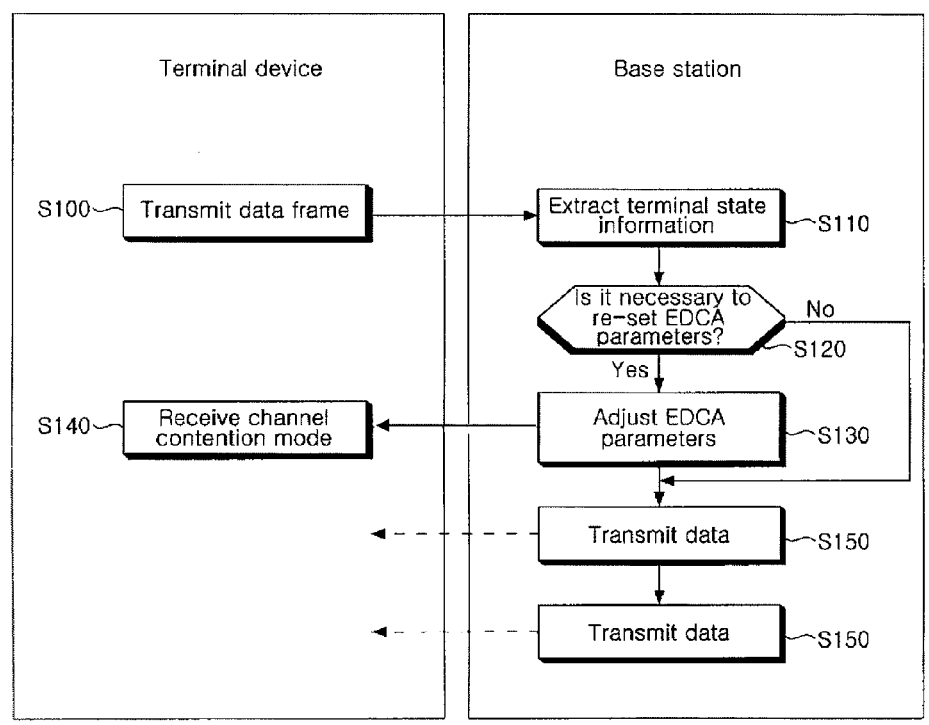
FIG. 7 is a flowchart illustrating a contention-based data communication method according to a preferred embodiment of the present invention.
Figure 8:
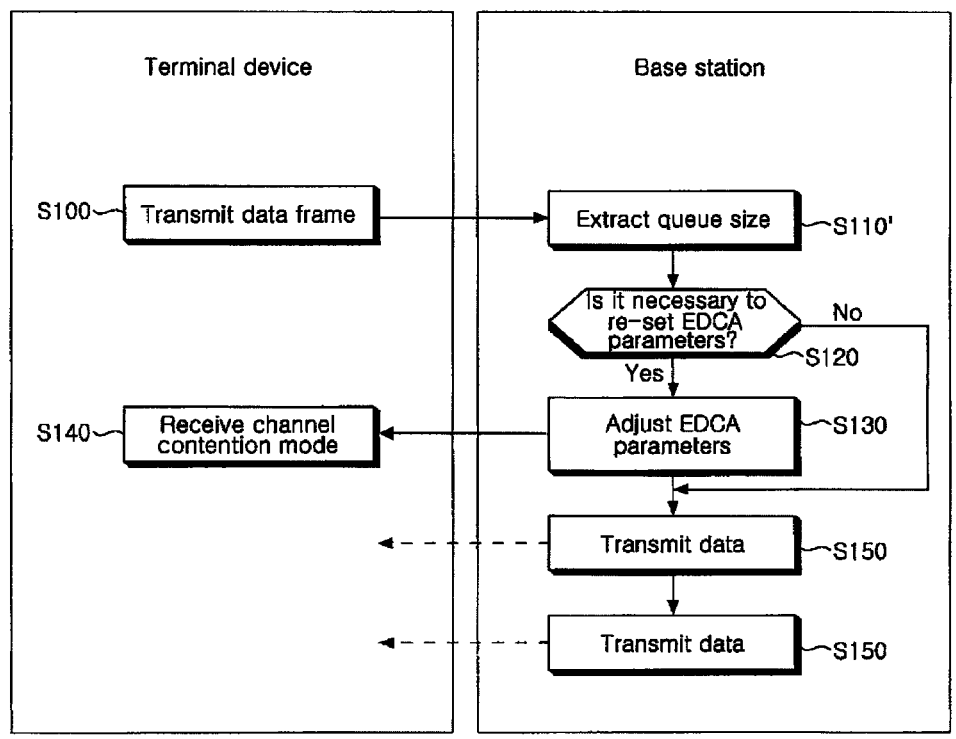
FIG. 8 is a flowchart illustrating a contention-based data communication method according to another preferred embodiment of the present invention.

FIG. 1 is a schematic view illustrating an EDCA channel access method, FIG. 2 is a schematic view illustrating a contention state between access categories (AC) within a station in the EDCA method, FIG. 3 is a schematic view illustrating EDCA TXOP bursting, FIG. 4 is a view showing a data structure of terminal state information according to a preferred embodiment of the present invention, FIG. 5 is a schematic view illustrating a HCF super frame structure comprising a contention period and a contention free period, FIG. 6 is a view showing a DATA frame structure according to a preferred embodiment of the present invention, FIG. 7 is a flowchart illustrating a contention-based data communication method according to a preferred embodiment of the present invention, and FIG. 8 is a flowchart illustrating a contention-based data communication method according to another preferred embodiment of the present invention.

To provide further advanced QoS in a wireless LAN, 802.11e MAC that has complemented legacy 802.11 MAC is provided.

IEEE 802.11e defines EDCA and HCCA that can support QoS at an MAC layer of a wireless LAN on the basis of the DCF transmission method of 802.11 MAC to provide a new wireless LAN MAC protocol that can transmit a traffic sensitive to transmission delay in addition to the best effort service.

802.1e defines hybrid coordination function (HCF) based on DCF and PCF of the legacy 802.11 MAC protocol. HCF includes a new medium access mechanism for improving QoS of a wireless LAN and can transmit QoS data in both a contention period and a contention free period. Hereinafter, QoS STA (QSTA: QoS station) defined in 802.11e refers to a station which supports QoS, and QoS AP (QAP) refers to an access point which supports QoS.

The HCF has two operation modes. One is enhanced distributed channel access (EDCA) based on contention, and another is HCF controlled channel access (HCCA) using a contention free channel access method based on a polling mechanism.

EDCA and HCCA are controlled by a hybrid coordinator (HC) located at an access point (hereinafter, referred to as AP) and are compatible with legacy 802.11 MAC using DCF and PCF. The EDCA provides a prioritized traffic similar to Diff-Serv of a wired network to support QoS, whereas the HCCA provides a parameterized traffic similar to IntServ of a wired network to guarantee QoS.

The EDCA method is used to support prioritized QoS in infrastructure mode and ad-hoc mode. That is, the EDCA provides a differentiated channel access function for frames that are granted with different priorities by an upper layer, whereas the HCCA provides parameterized QoS in infrastructure mode. 802.11e MAC establishes a virtual connection called as a traffic stream between two stations (terminals, hereinafter referred to as 'STA') before transmitting data in order to provide parameterized QoS. Characteristics of data that are actually transmitted and parameters that request QoS are subjected to negotiating and bartering operations in the process of establishing the traffic stream. The AP allocates a wireless bandwidth to each STA based on the bartered QoS parameters and schedules frame transmission to transmit polling frames, downlink frames and the like.

TXOP of 802.11e MAC is used to assign and guarantee a predetermined time period in which frames can be transmitted to a specific STA. A TXOP can be obtained by winning EDCA contention or by receiving a QoS CF-Poll frame from the AP. The former is called EDCA TXOP and the latter is called polled TXOP.

In this manner, using the TXOP, a predetermined time period is assigned so that a certain STA can transmit frames, or a transmission time period can be forcibly limited. A transmission starting time and a maximum transmission time period are determined by the AP, which are notified to the STA through a beacon frame in the case of the EDCA TXOP or through a QoS CF-Poll frame in the case of the polled TXOP.

EDCA is used only in a contention period, whereas HCCA can be operated in both a contention period and a contention free period. However, HCCA is preferably used only in a contention period.

Hereinafter, an EDCA method to which the present invention is applied will be described.

As described above, the EDCA, i.e. a contention-based channel access method, reinforces existing DCF to permit differentiated medium access for those frames with eight classes of user priorities. Table 1 shown below summarizes user priorities. Each frame arriving at the MAC layer from an upper layer has a specific user priority value, and the user priority value is loaded on the MAC header of each QoS data frame.

TABLE 1

Table of user priorities to access category mappings

| User priority | 802.1D Designation | AC (Access category) | Designation |
|---|---|---|---|
| 1 | BK | AC_BK | Back Ground |
| 2 | — | AC_BK | Back Ground |
| 0 | BE | AC_BE | Best Effort |
| 3 | EE | AC_BE | Best Effort |
| 4 | CL | AC_VI | Video |
| 5 | VI | AC_VI | Video |
| 6 | VO | AC_VO | Voice |
| 7 | NC | AC_VO | Voice |

For the transmission of QoS data frames containing those user priorities, an 802.11e QoS STA implements four access categories (AC) (refer to Table 1). The user priority of a frame arriving at the MAC layer is assigned to a corresponding AC. User priorities shown in Table 1 are specified in the IEEE 802.1D bridge standard, Every AC has a transmission queue and an AC parameter, and difference of priorities between the ACs is implemented from AC parameters that are set differently from each other.

Basically, in the contention for transmission of frames which belong to the ACs, EDCA uses AIFS[AC], CWmin [AC] and CWmax[AC] instead of DIFS, CWmin and CWmax which are used by DCF. The AIFS[AC] is determined by a SIFS+AIFS[AC] slot time, in which AIFS[AC] is an integer greater than 0. Values of these EDCA parameters will be described below.

The backoff procedure of EDCA for creating a new backoff counter when collision occurs between STAs while transmitting frames is similar to that of existing DCF. That is, in a contention-based medium access control method, if collision occurs due to the contention, a backoff procedure is invoked. In the present invention, parameters considering a terminal state are used for medium access control, so that a backoff procedure onto which the terminal state has been reflected is performed.

As shown in FIG. 1, the channel access method of EDCA is similar to that of DCF. However, arbitration inter frame space (AIFS) and CW that are different in each AC are maintained. Here, the AIFS should be a value greater than the PIFS and the DIFS to protect the transmission of ACK frames or the like by setting the value greater than at least a SIFS time period.

Values of AIFS[AC], CWmin[AC], CWmax[AC] and the like that are called an EDCA parameter set can be loaded on a beacon frame by the AP and then notified to each STA. Basically, the smaller the values of the AIFS[AC] and CWmin [AC] are, the higher priority an STA has. Accordingly, channel access delay is shortened, and thus, a further wider bandwidth can be used in a given traffic environment.

Information contained in the EDCA parameters of each AC can include access category identification (ACI)/arbitration inter frame spacing number (AIFSN), ECWmin/ECWmax, and TXOP Limit. Here, ACI is an identifier of a corresponding AC. AIFSN is the number of slots indicating a time delay which occurs before QAP and QSTA start transmitting traffics of the corresponding AC or call the backoff procedure defined in the standard. A real AIFS is a time period obtained by multiplying AFISN by a slot time and then adding a short inter-frame space (SIFS) thereto.

The EDCA parameters are important means used to differentiate channel accesses of a variety of user prioritized traffics. In addition, if values of the EDCA parameters containing parameters of each AC are appropriately set, network performance can be optimized and an effect of transmitting traffics according to priority can be obtained. Accordingly, to guarantee fair medium access to all participating STAs in the network, the AP is required to perform overall management and control of the EDCA parameters.

As shown in FIG. 2, each of the four AC transmission queues defined in 802.11e MAC functions as an individual EDCA contention entity to access a wireless medium within an STA. Each AC has a unique AIFS value and maintains an independent backoff counter. If one or more ACs complete a backoff procedure at the same time, the virtual collision handler coordinates collisions between the ACs. A frame with the highest priority is first selected and then transmitted to contend with other STAs, and the other ACs update the backoff counter by incrementing the CW value.

As described above, 802.11e determines a transmission time period based on a TXOP when a specific STA starts transmission. The 802.11e AP loads EDCA parameters such as AIFS[AC], CWmin[AC] and CWmax[AC], and a TXOP Limit [AC] such as an EDCA TXOP time period on a beacon frame and then transfers the beacon frame to each STA.

As shown in FIG. 3, during an EDCA TXOP Limit time period, a plurality of frames with a SIFS time gap between an ACK and a subsequent frame can be simultaneously transmitted. Transmitting a plurality of frames simultaneously as such is called 'EDCA TXOP bursting'.

During the EDCA TXOP Limit time period, two QoS data frames containing a priority are transmitted. At this time, it is understood that the two QoS data frames and two ACK frames are transmitted within the TXOP Limit time period determined by the AP. Since EDCA TXOP bursting always keeps the TXOP Limit when a plurality of frames are transmitted, overall network performance is not affected by the EDCA TXOP bursting. Therefore, selecting an appropriate TXOP Limit value can enhance overall network performance.

Meanwhile, the aforementioned terminal state information has a configuration as shown in FIG. 4.

As shown in the figure, the remaining battery capacity information, CPU load information, and temperature information are respectively 2-bit long, and an extra storage space is reserved.

If the traffic stream (TS) is set once, the HC allocates a wireless bandwidth required for the set traffic stream between the AP and an STA, thereby trying to provide contracted QoS. In a contention free period of HCCA, the HC has an overall control over the medium. If necessary, even in a contention period, the medium can be accessed by transmitting a QoS CF-Poll frame after an idle time as long as a PIFS. That is, even in a contention period, a QoS CF-Poll frame is transmitted to assign a polled TXOP, and a right to control the medium is thus obtained. Therefore, a periodically repeated HCF super frame includes both a contention free period and a contention period (refer to FIG. 5).

Furthermore, the terminal state information is a value varying with time, and the varying terminal state information should be transmitted to the AP.

To continuously transfer the terminal state information to the AP, a DATA frame is used in the present invention.

That is, a terminal state information area is added to a DATA frame transferred from a STA to the AP, and thus, a DATA frame containing the terminal state information is transferred to the AP.

To this end, a DATA frame according to the present invention has a structure shown in FIG. 6. That is, as shown in the figure, the terminal state information is contained in the DATA frame header including a frame control, duration identification (ID), address 1, address 2, address 3, sequence control, address 4, and QoS control.

At this time, the terminal state information has a structure shown in FIG. 4 as described above.

At this time, an area added according to the present invention is a terminal state area where state information of an STA is stored. State information stored in the terminal state area is preferably categorized into groups and then stored.

The terminal state information can have a variety of information on an STA. However, the remaining battery capacity information, CPU load information, and temperature information of the STA will be described herein by way of example.

First, the remaining battery capacity information will be discussed. The battery information can be categorized into four groups each of which can be identified by 2-bit data. (Of course, although the battery information can be stored after being broken down into further detailed groups, it is categorized into four groups considering an amount of terminal state information data.)

For example, as shown in Table 2 below, the remaining battery capacity is categorized as a first group and expressed as '11' if it is less than 30%, the capacity is categorized as a second group and expressed as '10' if it is greater than or equal to 30% and less than 50%, the capacity is categorized as a third group and expressed as '01' if it is greater than or equal to 50% and less than 75%, and the capacity is categorized as a fourth group and expressed as '00' if it is greater than or equal to 75%.

TABLE 2

| Remaining battery capacity (%) | Group | Data expression |
| --- | --- | --- |
| Less than 30 | 1 | 11 |
| Greater than or equal to 30 and less than 50 | 2 | 10 |
| Greater than or equal to 50 and less than 75 | 3 | 01 |
| Greater than or equal to 75 | 4 | 00 |

Next, the CPU load information will be discussed. As shown in Table 3 below, the CPU load is categorized as a first group and expressed as '11' if it is greater than or equal to 75%, the load is categorized as a second group and expressed as '10' if it is greater than or equal to 50% and less than 75%, the load is categorized as a third group and expressed as '01' if it is greater than or equal to 30% and less than 50%, and the load is categorized as a fourth group and expressed as '00' if it is less than 30%.

TABLE 3

| CPU load (%) | Group | Data expression |
| --- | --- | --- |
| Greater than or equal to 75 | 1 | 11 |
| Greater than or equal to 50 and less than 75 | 2 | 10 |

TABLE 3-continued

| CPU load (%) | Group | Data expression |
|---|---|---|
| Greater than or equal to 30 and less than 50 | 3 | 01 |
| Less than 30 | 4 | 00 |

Next, the temperature information will be discussed. As shown in Table 4 below, the temperature is categorized as a first group and expressed as '11' if it cannot be measured, the temperature is categorized as a second group and expressed as '10' if it is extremely high, the temperature is categorized as a third group and expressed as '01' if it is slightly high, and the temperature is categorized as a fourth group and expressed as '00' if it is appropriate.

TABLE 4

| Temperature | Group | Data expression |
|---|---|---|
| Impossible to measure | 1 | 11 |
| Extremely high | 2 | 10 |
| Slightly high | 3 | 01 |
| Appropriate | 4 | 00 |

At this time, since the criterion of temperature for determining an appropriate or high temperature varies according to types and characteristics of terminals, it is preferable to set the temperatures depending on the characteristics of terminals.

In a preferred embodiment of the present invention, the channel contention mode is set in such a manner that transmission waiting time becomes longer as the remaining battery capacity decreases and the CPU load and temperature increase. At this time, it is apparent that the channel contention mode can be set to reduce the continuity of data transmission.

Further, the terminal state information of the present invention can include a queue size indicating an amount of data stored in the terminal buffer.

If the amount of data stored in the terminal buffer is large (as the queue size increases), the terminal is relatively less necessary to receive data preferentially to other terminals. Therefore, the channel contention mode is set to have a long transmission waiting time.

Hereinafter, a contention-based data communication method according to the present invention is described in detail with reference to the accompanying drawings.

FIG. 7 is a flowchart illustrating a contention-based data communication method according to a preferred embodiment of the present invention.

As shown in the figure, to set channel contention mode according to an embodiment of the present invention, a terminal first constructs a data frame containing its state information and transmits the data frame to a base station (S100).

The base station that has received the data frame determines using the terminal state information contained in the data frame whether it is necessary to re-set channel contention parameters (S120). That is, it is determined whether the terminal state information is changed and thus new parameters need to be applied.

If it is determined that the new channel contention parameters need to be set, the base station adjusts the channel contention parameters (EDCA parameters) using the received terminal state information (S130).

Then, the new channel contention mode is transmitted to the terminal (S140).

Next, data are transmitted to the terminal according to the changed channel contention mode (S150).

Steps S100 to S150 can be repeated periodically or non-periodically to reflect the terminal state information which is changed over time. Here, the steps may be performed non-periodically when the base station determines that the channel contention mode needs to be updated. The base station requests the terminal state information from the terminal and updates the channel contention mode.

As shown in FIG. 8, in another embodiment of the present invention, the base station may receive the queue size of the terminal (S510') and set the channel contention mode using the queue size.

Of course, the channel contention mode can be set comprehensively considering the terminal state information and the queue size, and the queue size may be an element of the terminal state information.

The following advantages can be expected from the contention-based data communication system and method according to the present invention described above in detail.

That is, since channel contention mode is set using state information of a terminal device to transmit data, there is an advantage in that optimal data transmission considering a state of a receiving side can be performed when transmitting data.

Further, since the terminal state information is continuously transmitted to the AP and the AP updates the channel contention mode according to the updated terminal state information, there is another advantage in that optimal channel contention mode can be maintained.

In addition, since channel contention mode in which a terminal state is considered is set, there is a further advantage in that an excessive operation of a terminal can be avoided and thus power consumption of the terminal device can also be reduced.

Meanwhile, although the present invention has been described and illustrated in connection with the preferred embodiments, it will be readily understood by those skilled in the art that various modifications and changes can be made thereto without departing from the spirit and scope of the present invention defined by the appended claims.

What is claimed is:

1. A contention-based data communication system in an IEEE 802.11 EDCA type wireless communication system in which a plurality of terminals contend to obtain data transmission resources, the system comprising:
   a base station configured to control the IEEE 802.11 EDCA type wireless communication system; and
   the plurality of terminals connected to the base station and configured to transmit and receive data,
   wherein a terminal of the plurality of terminals transmits a data frame, where frame control, duration identification (ID), address, sequence control, quality of service (QoS) control and terminal state information representing a state thereof is included in a MAC header area of the data frame, to the base station,
   wherein the terminal state information includes a load volume and a temperature of a CPU of the terminal, and
   wherein the base station
      requests the terminal state information from the terminal when a channel contention mode is to be re-set,
      determines whether values of the channel contention parameters are to be adjusted,
      adjusts the values of the channel contention parameters using the terminal state information,
      re-sets the channel contention mode according to the adjusted values of the channel contention parameters in such a manner that a transmission waiting time becomes shorter as the load volume and the temperature of the CPU decreases,
transmits information about the re-set channel contention mode to the terminal, and
transmits data according to the re-set channel contention mode to the terminal.

2. The system as claimed in claim 1, wherein each of the load volume and the temperature of the CPU is divided into four groups each, and is expressed as 2-bit data.

3. The system as claimed in claim 1, wherein the channel contention mode is re-set in such a manner that the adjusted values of the channel contention parameters correspond to the terminal state information.

4. The system as claimed in claim 3, wherein the channel contention parameters include any one or more of Arbitration Inter Frame Space (AIFS), minimum contention window (CWmin) and maximum contention window (CWmax) which determine a backoff time.

5. A terminal for a contention-based data communication system in an IEEE 802.11 EDCA type wireless communication system comprising a base station for controlling wireless communication and a plurality of terminals connected to the base station and configured to transmit and receive data, in which the plurality of terminals contend to obtain data transmission resources from the base station,
wherein the terminal is one of the plurality of terminals and is configured to transmit a data frame, where frame control, duration identification (ID), address, sequence control, quality of service (QoS) control and terminal state information thereof is included in a MAC header area of the data frame, to the base station,
wherein the terminal state information includes a load volume and a temperature of a CPU of the terminal,
wherein the terminal is configured to receive a request from the base station for the terminal state information when the base station determines that the channel contention mode is to be re-set,
wherein the terminal is configured to transmit the terminal state information to the base station in response to the request,
wherein the base station adjusts values of the channel contention parameters based on the terminal state information and re-sets the channel contention mode according to the adjusted values of the channel contention parameters in such a manner that a transmission waiting time becomes shorter as the load volume and the temperature of the CPU decreases, and
wherein the terminal is configured to receive data from the base station according to the re-set channel contention mode.

6. A base station which is used for a contention-based data communication system in an IEEE 802.11 EDCA type wireless communication system comprising the base station for controlling wireless communication and a plurality of terminals connected to the base station and configured to transmit and receive data, in which the plurality of terminals contend to obtain data transmission resources from the base station, wherein the base station comprises a processor which is configured to:
receive a data frame, where frame control, duration identification (ID), address, sequence control, quality of service (QoS) control and terminal state information representing a state thereof is included in a MAC header area of the data frame, transmitted from a terminal of the plurality of terminals,
wherein the terminal state information includes a load volume and a temperature of a CPU of the terminal,
request the terminal state information from the terminal when the base station determines that the channel contention mode is to be re-set,
determine whether the channel contention parameters are to be adjusted,
adjust the values of the channel contention parameters using the terminal state information,
re-set the channel contention mode according to the adjusted values of the channel contention parameters in such a manner that a transmission waiting time becomes shorter as the load volume and the temperature of the CPU decreases,
transmit information about the re-set channel contention mode to the terminal, and
transmit data according to the re-set channel contention mode to the terminal.

7. The base station as claimed in claim 6, wherein each of the remaining battery capacity information, the load volume and the temperature of the CPU is divided into four groups, and is expressed as 2-bit data.

8. The base station as claimed in claim 6, wherein the channel contention mode is re-set in such a manner that the adjusted values of the channel contention parameters correspond to the terminal state information.

9. The base station as claimed in claim 8, wherein the channel contention parameters include any one or more of Arbitration Inter Frame Space (AIFS), minimum contention window (CWmin) and maximum contention window (CWmax) which determine a backoff time.

10. A contention-based data communication method for use in an IEEE 802.11 EDCA type wireless communication system in which a plurality of terminals contend to obtain data transmission resources, the method comprising the steps of:
(I) requesting, by a base station, terminal state information from a terminal of the plurality of terminals when the base station determines that a channel contention mode is to be re-set and determining whether values of channel contention parameters are to be adjusted,
wherein the terminal state information includes a load volume and a temperature of a CPU of the terminal;
(II) receiving, by the base station from the terminal, a data frame, where frame control, duration identification (ID), address, sequence control, quality of service (QoS) control and the terminal state information is included in a MAC header area of the data frame;
(III) adjusting the values of the channel contention parameters using the terminal state information by the base station;
(IV) re-setting the channel contention mode according to the adjusted values of the channel contention parameters by the base station in such a manner that a transmission waiting time becomes shorter as the load volume and the temperature of the CPU decreases;
(V) transmitting information about the re-set channel contention mode from the base station to the terminal;
(VI) receiving, by the base station from the terminal, a request to obtain the data transmission resources in the re-set channel contention mode; and
(VII) transmitting, by the base station, data according to the re-set channel contention mode to the terminal.

11. The method as claimed in claim 10, wherein steps (I) to (VII) are repeatedly performed.

12. The method as claimed in claim 10, wherein the terminal state information includes an amount of data stored in a buffer of the terminal.

13. The method as claimed in any one of claims 10, 11, and 12, wherein the channel contention mode is re-set in such a manner that the adjusted values of the channel contention parameters correspond to the terminal state information.

14. The method as claimed in claim 13, wherein the channel contention parameters include any one or more of Arbitration Inter Frame Space (AIFS), minimum contention window (CWmin) and maximum contention window (CWmax) which determine a backoff time.

15. A contention-based data communication method for use in an IEEE 802.11 EDCA type wireless communication in which a plurality of terminals contend to obtain data transmission resources from a base station, the method comprising the steps of:
   receiving channel contention information transmitted from the base station by a terminal of the plurality of terminals;
   accessing the base station by the terminal to obtain the data transmission resources according to the channel contention information;
   receiving a request, by the terminal from the base station, for terminal state information when the base station determines that a channel contention mode is to be re-set;
   transmitting, by the terminal, a data frame to the base station, where frame control, duration identification (ID), address, sequence control, quality of service (QoS) control and the terminal state information is included in a MAC header area of the data frame,
   wherein the terminal state information includes a load volume and a temperature of a CPU of the terminal, and
   wherein the base station
      determines whether values of channel contention parameters are to be adjusted,
      adjusts the values of the channel contention parameters using the terminal state information, and
      resets the channel contention mode according to the adjusted values of the channel contention parameters in such a manner that a transmission waiting time becomes shorter as the load volume and the temperature of the CPU decreases;
   receiving information about the re-set channel contention mode from the base station by the terminal;
   accessing the base station by the terminal to obtain the data transmission resources according to the information about the re-set channel contention mode; and
   receiving data according to the re-set channel contention mode from the base station by the terminal.

16. The method as claimed in claim 15, wherein the channel contention mode is re-set in such a manner that the adjusted values of the channel contention parameters correspond to the terminal state information.

* * * * *